United States Patent [19]

Kondo

[11] Patent Number: 4,773,995

[45] Date of Patent: Sep. 27, 1988

[54] MAGNET FILTER

[75] Inventor: Yuzuru Kondo, Settsu, Japan

[73] Assignee: Nihon Gijutsu Kaihatsu Kabushiki Kaisha, Osaka, Japan

[21] Appl. No.: 879

[22] Filed: Jan. 6, 1987

[30] Foreign Application Priority Data

Aug. 29, 1986 [JP] Japan .......................... 61-131291[U]

[51] Int. Cl.[4] .............................................. B01D 35/06

[52] U.S. Cl. ..................................... 210/222; 210/232

[58] Field of Search ................... 123/196 A; 335/305; 210/222, 223, 232, 695; 267/150, 158, 160; 292/253, 303; 248/27.3, 231.8, 316.7; 24/457, 458, 293, 295

[56] References Cited

U.S. PATENT DOCUMENTS

| | | | |
|---|---|---|---|
| 819,436 | 5/1906 | Jones | 210/222 |
| 1,806,001 | 5/1931 | Simms et al. | 210/222 |
| 1,944,208 | 1/1934 | Bock | 210/222 X |
| 2,877,899 | 3/1959 | Hutchins et al. | 210/222 |
| 3,151,703 | 10/1964 | Benk | 210/222 |
| 3,800,914 | 4/1974 | Miyata | 210/222 X |

FOREIGN PATENT DOCUMENTS

| | | | |
|---|---|---|---|
| 61-7797 | 3/1961 | Japan . | |
| 61-7796 | 3/1961 | Japan . | |
| 307547 | 3/1929 | United Kingdom | 210/222 |

*Primary Examiner*—Richard V. Fisher

*Assistant Examiner*—W. Gary Jones

*Attorney, Agent, or Firm*—Wenderoth, Lind & Ponack

[57] ABSTRACT

An improved magnet filter of the type in which a planar magnet piece (1) is wrapped by a magnetically permeable plate (2) made of magnetic metal, is disclosed. The improvements are that a sheet spring piece (3) in sandwiched between the respective bottom portions of the permanent magnet piece (1) and the magnetically permeable plate (2), and flexed pieces (*3a*, *3b*$_1$, *3b*$_2$) at the opposite ends of the sheet spring piece (3) project from the magnet filter so as to extend obliquely upwards on the outside of the magnet filter.

3 Claims, 2 Drawing Sheets

MAGNET FILTER

BACKGROUND OF THE INVENTION

The present invention relates to improvements in a magnet filter adapted to be mounted in a gear box, an oil reservoir or the like.

In the case of mounting in a gear case (B) or the like a magnet filter (A) of the type that has a lower surface and outer side surfaces of a planar permanent magnet piece (a) wrapped in a magnetically permeable plate (b) made of magnetic metal such as shown in FIGS. 7 to 9 and disclosed in Japanese Utility Model Publications Nos. 61-7796 and 61-7797, the magnet filter (A) is engaged with locking grooves of mount guides (C), and an anti-slip-out metal member (d) made of resilient material is engaged with the magnet filter (A) with the tip end of the metal member (d) engaged with a back-stopper projection (e) provided on the inner wall of the gear case (B), and thereby the magnet filter (A) is fixedly secured to the geat box (B).

Hence, in the case of the above-described magnet filter in the prior art, mount guides (c) and the locking metal member (d) were necessary for mounting the magnet filter in a gear box, an oil reservoir or the like, and mounting of the magnet filter at a location where the locking metal member cannot be fixedly secured, was not possible.

SUMMARY OF THE INVENTION

It is therefore one object of the present invention to provide an improved magnet filter which is free from the above-described disadvantages of the magnet filter in the prior art.

Another object of the present invention is to provide a magnet filter which can be easily mounted in a recessed portion of an inner wall of a gear box, an oil reservoir or the like without necessitating mount guides and an anti-slip-out member metal.

According to one feature of the present invention, there is provided a magnet filter of the type having a planar permanent magnet piece is wrapped in a magnetically permeable plate made of magnetic metal, and in which a sheet spring piece is sandwiched between the bottom portions of the permanent magnet piece and the magnetically permeable plate, and flexed portions at the opposite side ends of the sheet spring piece project from the magnet filter so as to extend obliquely upwards on the outside of the filter.

Since the magnet filter according to the present invention is constructed with a sheet piece sandwiched between bottom portions of a planar permanent magnet piece and a magnetically permeable plate made of magnetic metal wrapping the magnet piece, and flexed portions at the opposite side endsof the sheet spring piece project from the magnet filter so as to extend obliquely upwards on the outside of the filter as featured above, when the magnet filter is fitted in a recessed portion of a gear case or the like, the free ends of the flexed portions at the opposite side ends of the sheet spring piece will bite into the inner peripheral wall of the recessed portion and prevent the filter from slipping out of the recessed portion, and thereby the magnet filter can be fixedly mounted on the gear case or the like.

As described above, according to the present invention, a magnet filter of the type having a planar permanent magnet piece wrapped by a magnetically permeable plate made of magnetic metal, is improved in that an anti-slip-out effect for a mounted magnet filter is achieved by employing a sheet spring piece having flexed portions at the opposite side ends extending obliquely upwards on the outside of the filter and sandwiched between the bottom portions of the permanent magnet piece and the magnetically permeable plate, whereby an anti-slip-out metal member for the oil filter is made unnecessary, mounting of the magnetic filter is made easier than the magnetic filters in the prior art, mounting of the magnetic filter is made possible even at a location where an anti-slip-out metal member cannot be fixedly secured, and hence restriction on the mounting location of the magnetic filter can be reduced.

The above-mentioned and other objects, features and advantages of the present invention will become more apparent upon perusal of the following specification taken in conjunction with the accompanying drawings.

DESCRIPTION OF THE PREFERRED EMBODIMENT

Figure 1:
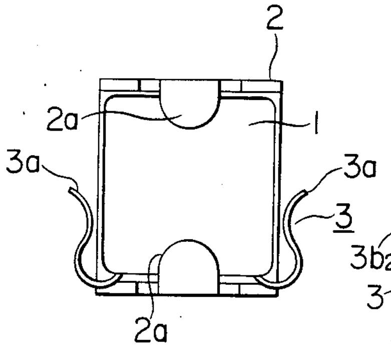
FIG. 1 is a front view showing one preferred embodiment of a magnetic filter according to the present invention.
Figure 2:
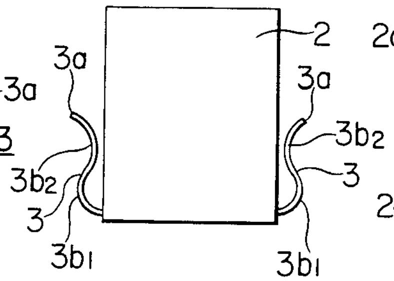
FIG. 2 is a rear view of the same magnetic filter.
Figure 3:
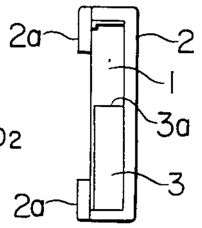
FIG. 3 is a side view of the same.
Figure 4:
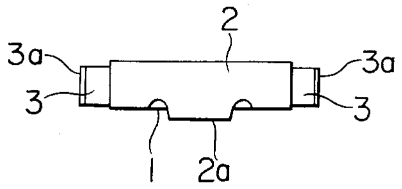
FIG. 4 is a plan view of the same.
Figure 5:
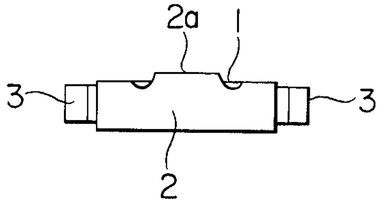
FIG. 5 is a bottom view of the same.

Referring now to FIGS. 1 to 6 of the drawings, reference numeral (1) designates a planar permanent magnet piece, whose upper and lower parts of the peripheral edge and the rear face thereof are wrapped by a magnetically permeable plate (2) made of magnetic metal, and opposite ends (2*a*) extending across the upper and lower edge portions of the permanent magnet piece (1) and bent from the edge portions of the magnetically permeable plate (2) over the front face of the magnetic piece.

Reference numeral (3) designates a sheet spring piece having flexed pieces at the opposite end portions which are bent transversely of the plane of the sheet into an S-shape and whose free end parts (3*a*) extend obliquely upwards, and the sheet spring piece (3) is sandwiched between the bottom edge of the permanent magnet piece (1) and the magnetically permeable plate (2) in such manner that the respective flexed pieces may project sidewards of the magnet filter.

Figure 6:
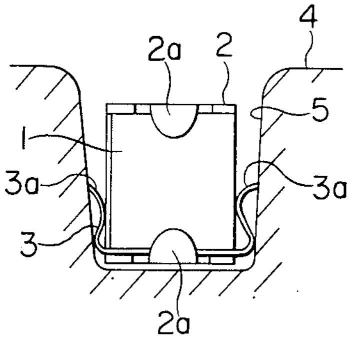
FIG. 6 is a longitudinal cross-section view showing mounting of the magnetic filter of FIGS. 1-5.
Figure 7:
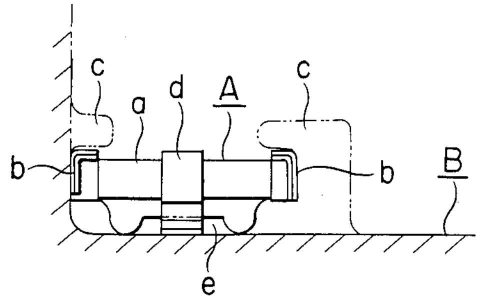
FIG. 7 is a front view showing a magnet filter of the prior art in the mounted condition.
Figure 8:
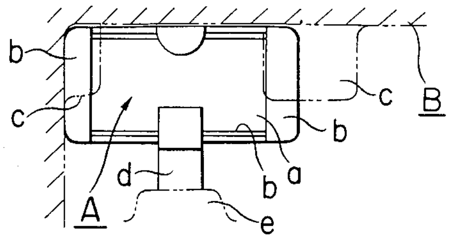
FIG. 8 is a plan view of the same.
Figure 9:
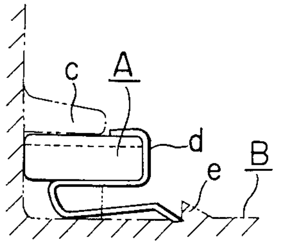
FIG. 9 is a side view of the same.

In the illustrated embodiment, since the magnet filter is constructed in the above-described manner, when the magnet filter is inserted into a recessed portion of a gear case (4) as shown in FIG. 6, a lower outwardly curved portion (3$b_1$) and an upper inwardly curved portion (3$b_2$) of the S-shaped flexed piece at the end of the sheet spring piece (3) projecting outside of the magnet filter will resiliently engage the inner peripheral wall surface of the recessed portion (5) and the outer surface of the magnet filter, respectively, and thereby backlash of the magnet filter in the recessed portion (5) can be eliminated. Also, the free end portions (3*a*) of the sheet spring piece (3) will bite into the inner peripheral wall of the recessed portion (5), and thereby the magnet filter is prevented from slipping out of the recessed portion.

Thus, according to the above-described embodiment, the sheet spring piece (3) is sandwiched between the respective bottom edge of the planar magnet piece (1) forming a principal part of the magnet filter and the magnetically permeable plate (2) made of magnetic metal which wraps the magnet piece (1), and slip-out of the magnet filter from the gear case (4) upon mounting the former to the latter is prevented by means of the flexed pieces at the ends of the sheet spring piece (3), and hence the anti-slip-out metal member used in the above-described magnet filter in the prior art is made unnecessary, it is made possible to mount the magnet filter even at a location where the anti-slip-out metal member cannot be secured, and thereby the restriction on the location for mounting the magnet filter can be reduced.

Furthermore, upon mounting the magnet filter on the gear case (4), it is only necessary to insert the magnet filter into the recessed portion (5) formed in the gear case (4), then the magnet filter can be fixed by mutual biting between the free end portions (3*a*) of the flexed pieces at the ends of the sheet spring piece (3) and the inner wall surfaces of the recessed portion (5), and thus mounting of the magnet filter can be achieved easily.

While a principle of the present invention has been described above in connection to one preferred embodiment of the invention, it is clear that many apparently widely different embodiments can be made without departing from the spirit of the present invention.

What is claimed is:

1. A magnet filter comprising:

a planar permanent magnet piece having front and rear faces and a peripheral edge between said faces;

a magnetically permeable plate made of magnetic metal against one face and having opposite ends extending across edge portions of said magnet piece and bent over against the other face;

a sheet spring piece held between one of said edge portions of said permanent magnet piece and the end of said magnetically permeable plate extending thereacross, said sheet spring piece having opposite end parts projecting outwardly from the peripheral edge of said magnet piece and extending obliquely outwardly away from said peripheral edge of said magnet piece, said sheet spring piece being means for mounting the filter so that when said magnet filter is inserted into a recess in the wall of an oil containing casing, said end parts engage the inner wall surface of the recess for retaining the magnet filter in the recess.

2. A magnet filter as claimed in claim 1 in which said end parts of said sheet spring piece are bent transversely of the plane of the sheet spring piece into an S-shape, and the free end portions of said S-shape end parts extend obliquely upwardly.

3. A magnet filter as claimed in claim 2 in which each said S-shape part has an outwardly curved portion curving convexly away from the edge of said magnet piece, and an inwardly curved portion between said outwardly curved portion and said free end portion and curved concavely toward the edge of said magnet piece, whereby when said magnet filter is inserted into the recess, the respective curved portions will resiliently engage the inner wall surface of the recess and the peripheral edge of said magnet piece, whereby backlash of said magnet filter in the recess is prevented.

* * * * *